(12) United States Patent
Hitomi et al.

(10) Patent No.: US 11,856,529 B2
(45) Date of Patent: Dec. 26, 2023

(54) COMMUNICATION CIRCUIT AND CONTROL METHOD FOR COMMUNICATION CIRCUIT

(71) Applicant: Murata Manufacturing Co., Ltd., Kyoto (JP)

(72) Inventors: Shinya Hitomi, Nagaokakyo (JP); Hidenori Obiya, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/818,843

(22) Filed: Aug. 10, 2022

(65) Prior Publication Data

US 2022/0394630 A1    Dec. 8, 2022

Related U.S. Application Data

(62) Division of application No. 16/898,183, filed on Jun. 10, 2020, now Pat. No. 11,452,050.

(30) Foreign Application Priority Data

Jun. 14, 2019 (JP) .................. 2019-111012

(51) Int. Cl.
*H04W 52/36* (2009.01)
*H04B 7/06* (2006.01)

(52) U.S. Cl.
CPC .......... *H04W 52/36* (2013.01); *H04B 7/0613* (2013.01)

(58) Field of Classification Search
CPC ..... H04W 52/36; H04W 52/42; H04W 52/52; H04B 7/0613; H04B 1/005; H04B 17/13; H04B 2001/0416; H04B 10/564; H04B 1/04; H04B 1/02; H04B 7/0689; H04B 7/26; H04B 17/101; H04B 1/38; H04B 1/70755; H04B 17/10; H04B 7/06;
(Continued)

(56) References Cited

U.S. PATENT DOCUMENTS 6,141,538 A     10/2000  Consolazio et al.
6,240,279 B1 *   5/2001  Nitta .............. H04B 2001/0416
                                              455/127.2
(Continued)

FOREIGN PATENT DOCUMENTS

GB      2572884 B         1/2020
JP      2016-092827 A     5/2016
(Continued)

OTHER PUBLICATIONS

Skyworks Solutions Inc., WF on ACLR for intra-band non-contiguous ENDC, 3GPP TSG-RAN WG4 Meeting 90, 2019, pp. 1-8, R4-1902171, Skyworks Solutions Inc., Athens, Greece.

*Primary Examiner* — Lana N Le
(74) *Attorney, Agent, or Firm* — Pearne & Gordon LLP

(57) ABSTRACT

A communication circuit includes a first transfer circuit that includes a first transmitter circuit, and a second transfer circuit that includes a second transmitter circuit that can transmit a signal simultaneously with the first transmitter circuit. The second transmitter circuit is configured to be placed in a transmission halt state when transmission power of the second transmitter circuit resulting from being decreased by a predetermined value is lower than or equal to a threshold.

8 Claims, 4 Drawing Sheets

(58) Field of Classification Search
CPC ........ H04B 1/40; H04B 10/50; H04B 7/0693; H04B 1/0483; H04B 1/006; H04B 1/16; H04B 1/44; H04B 7/18543; H04B 17/102; H04B 10/07955; H04B 7/005; H04B 5/0037
See application file for complete search history.

(56) References Cited

U.S. PATENT DOCUMENTS

| | | |
|---|---|---|
| 6,260,975 B1 | 7/2001 | Nagano |
| 7,633,964 B2 * | 12/2009 | Oishi .................... H04B 17/10 |
| | | 455/522 |
| 8,059,542 B1 | 11/2011 | Oroskar et al. |
| 10,153,645 B1 | 12/2018 | Bell et al. |
| 11,228,988 B2 | 1/2022 | Hitomi et al. |
| 11,246,106 B2 * | 2/2022 | Cho ...................... H04W 52/52 |
| 11,595,905 B2 * | 2/2023 | Haghighat ............ H04W 52/42 |
| 2002/0176513 A1 | 11/2002 | Gouessant et al. |
| 2009/0001932 A1 | 1/2009 | Kamijo et al. |
| 2012/0044898 A1 * | 2/2012 | Ishii .................... H04W 52/367 |
| | | 455/522 |
| 2012/0063317 A1 | 3/2012 | Muraoka et al. |
| 2013/0077522 A1 * | 3/2013 | Iyama ................... H04W 52/36 |
| | | 455/522 |
| 2016/0127029 A1 * | 5/2016 | Wloczysiak ............. H04B 1/16 |
| | | 455/101 |
| 2017/0019892 A1 | 1/2017 | Mitsui et al. |

FOREIGN PATENT DOCUMENTS

| | | | |
|---|---|---|---|
| JP | 2019-062444 A | 4/2019 | |
| WO | WO-2012141239 A1 * | 10/2012 | ........... H04B 5/0037 |

\* cited by examiner

COMMUNICATION CIRCUIT AND CONTROL METHOD FOR COMMUNICATION CIRCUIT

CROSS REFERENCE TO RELATED APPLICATION

The present application is a division of U.S. patent application Ser. No. 16/898,183 filed on Jun. 10, 2020, which is based on and claims priority of Japanese Patent Application No. 2019-111012 filed on Jun. 14, 2019. The entire disclosure of the above-identified application, including the specification, drawings and claims is incorporated herein by reference in its entirety.

BACKGROUND

The present disclosure relates to a communication circuit and a control method for the communication circuit, and in particular to a communication circuit that includes two transmitter circuits that can simultaneously transmit signals. The present disclosure relates to a communication circuit and a control method for the communication circuit, and in particular to a communication circuit that includes two transmitter circuits that can simultaneously transmit signals.

In view of a transition to the fifth generation mobile communication system (5G) referred to as New Radio (NR), the Third Generation Partnership Project (3GPP), which is a project of defining specifications for a mobile communication system, has been requesting that a terminal device be able to simultaneously transmit a signal in accordance with the fourth generation mobile communication system (4G) referred to as Long Term Evolution (LTE) or Evolved Universal Terrestrial Radio Access (E-UTRA), and a signal in accordance with 5G (through E-UTRA-NR dual connectivity (EN-DC)).

To achieve this, various types of communication methods that support EN-DC have been conventionally proposed (for example, refer to Japanese Unexamined Patent Application Publication No. 2019-62444). Japanese Unexamined Patent Application Publication No. 2019-62444 has proposed a technology of allowing efficient communication between a base station device and a terminal device even if conventional DC implemented using an LTE cell is applied to NR.

BRIEF SUMMARY

Technical Problem

In accordance with the requirements defined by the 3GPP, a terminal device will be requested, in EN-DC, to uniformly decrease LTE transmission power and NR transmission power when the spurious emissions requirements are not satisfied due to intermodulation distortion. Here, the case where the spurious emissions requirements (TS38.101) are not satisfied due to intermodulation distortion is when in EN-DC, a transmission signal from one of an LTE transfer circuit and an NR transfer circuit sneaks into the other transfer circuit, and as a result, the amount of spurious emission components included in a transmission signal from the other transfer circuit exceeds a defined value.

However, if the LTE transmission power and the NR transmission power are decreased uniformly, the transmission power could be decreased below the lower limit of transmission power. For example, if a transfer circuit having higher transmission power is the cause of intermodulation distortion, transmission power of a transfer circuit having lower transmission power may fall below the lower limit as a result of uniformly decreasing both the transmission power of one transfer circuit and the transmission power of the other transfer circuit. Thus, it is necessary to take certain measures to prevent transmission power of a transfer circuit from falling below the lower limit. Here, the lower limit of transmission power is the minimum valve of transmission power determined based on restrictions such as a specification of a terminal device, a request from a base station device, or performance of circuit operation of a transfer circuit, and is a value defined as minimum output power in TS38.101-1.

However, the terminal device according to Japanese Unexamined Patent Application Publication No. 2019-62444 has a problem that communication does not necessarily comply with the requirements since such spurious emissions due to intermodulation distortion are not taken into consideration.

In view of this, the present disclosure is to provide a communication circuit that can perform communication in compliance with the requirements in DC, and a control method for the communication circuit.

Solution to Problem

In order to provide such a communication circuit, a communication circuit according to an aspect of the present disclosure includes: a first transmitter circuit; and a second transmitter circuit configured to transmit a signal simultaneously with the first transmitter circuit. The second transmitter circuit is configured to be placed in a transmission halt state when transmission power of the second transmitter circuit resulting from being decreased by a predetermined value is lower than or equal to a threshold.

In order to provide such a communication circuit, a communication circuit according to another aspect of the present disclosure includes: a first transmitter circuit; and a second transmitter circuit configured to transmit a signal simultaneously with the first transmitter circuit. When transmission power of the second transmitter circuit resulting from being decreased by a predetermined value is lower than or equal to a threshold, the first transmitter circuit is configured to transmit a signal with transmission power resulting from being decreased by a value greater than the predetermined value, and the second transmitter circuit is configured to transmit a signal with transmission power higher than the threshold.

In order to provide such a control method, a control method for a communication circuit according to an aspect of the present disclosure is a control method for a communication circuit that includes a first transmitter circuit, and a second transmitter circuit configured to transmit a signal simultaneously with the first transmitter circuit, the control method including: calculating decreased transmission power of the second transmitter circuit, the decreased transmission power being transmission power of the second transmitter circuit resulting from being decreased by a predetermined value; determining whether the decreased transmission power calculated is lower than or equal to a threshold; and performing control to place the second transmitter circuit in a transmission halt state when the decreased transmission power is determined to be lower than or equal to the threshold.

In order to provide such a control method, a control method for a communication circuit according to another aspect of the present disclosure is a control method for a communication circuit that includes a first transmitter circuit, and a second transmitter circuit configured to transmit a signal simultaneously with the first transmitter circuit, the control method including: calculating decreased transmission power of the second transmitter circuit, the decreased transmission power being transmission power of the second transmitter circuit resulting from being decreased by a predetermined value; determining whether the decreased transmission power calculated is lower than or equal to a threshold; and performing control when the decreased transmission power is determined to be lower than or equal to the threshold, to cause the first transmitter circuit to transmit a signal with transmission power resulting from being decreased by a value greater than the predetermined value, and to cause the second transmitter circuit to transmit a signal with transmission power higher than the threshold.

Advantageous Effects

According to the present disclosure, a communication circuit that can perform communication in compliance with the requirements in DC, and a control method for the communication circuit are provided. According to the present disclosure, a communication circuit that can perform communication in compliance with the requirements in DC, and a control method for the communication circuit are provided.

BRIEF DESCRIPTION OF THE SEVERAL VIEWS OF THE DRAWINGS

These and other advantages and features will become apparent from the following description thereof taken in conjunction with the accompanying Drawings, by way of non-limiting examples of embodiments disclosed herein.

DETAILED DESCRIPTION

The following describes in detail embodiments of the present disclosure, with reference to the drawings. Note that the embodiments described below each describes a specific example of the present disclosure. The numerical values, circuit components, the connection of the circuit components, processing steps, the order of performing the processing steps, and others indicated in the following embodiments are mere examples, and are not intended to limit the present disclosure. The drawings do not necessarily provide strictly accurate illustration. Throughout the drawings, the same numeral is given to substantially the same element, and redundant description may be omitted or simplified.

Embodiment

Figure 1:
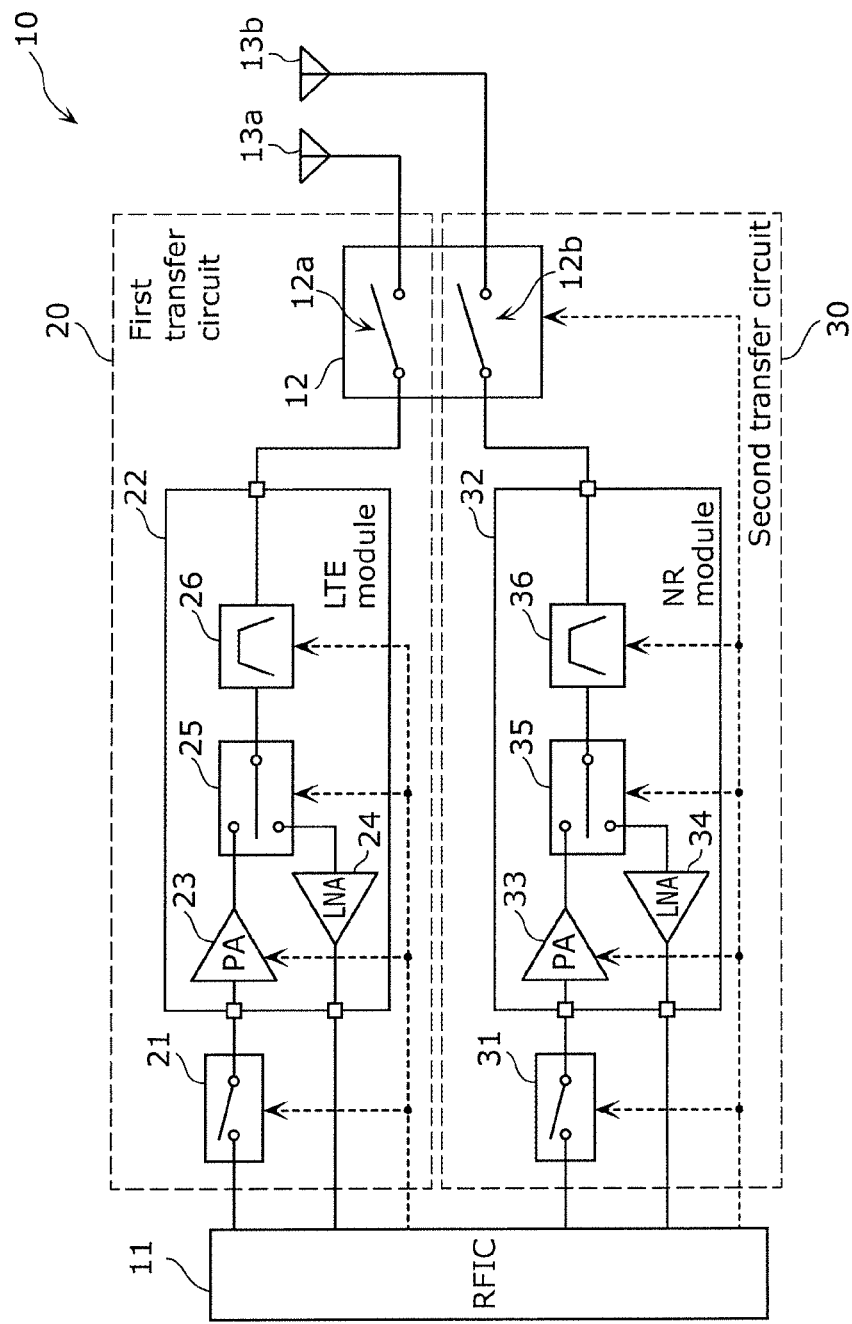
FIG. 1 is a block diagram of a communication circuit according to an embodiment.

FIG. 1 is a block diagram of communication circuit 10 according to an embodiment. Communication circuit 10 supports EN-DC, and includes radio frequency (RF) signal processing circuit (RF integrated circuit (RFIC)) 11, first transfer circuit 20, second transfer circuit 30, antenna switch 12, first antenna 13a, and second antenna 13b. Note that in the present embodiment, communication circuit 10 is included in a terminal device that communicates with base station devices.

First transfer circuit 20 is an example of a transfer circuit that includes a first transmitter circuit, and in the present embodiment, is a radio frequency circuit that transmits and receives signals in accordance with LTE (more specifically, E-UTRA). First transfer circuit 20 includes input switch 21, LTE module 22, and one switch (first antenna switch 12a) in antenna switch 12. Note that the first transmitter circuit corresponds to a circuit for transmission that includes, among the elements of first transfer circuit 20, input switch 21, first antenna switch 12a, and power amplifier (PA) 23, transmission reception switch 25 and bandpass filter 26 that are included in LTE module 22.

Input switch 21 connects and disconnects power amplifier 23 to/from RF signal processing circuit 11, allows and interrupts input of a transmission signal output by RF signal processing circuit 11 to power amplifier 23, under the control of RF signal processing circuit 11. Input switch 21 includes a field effect transistor (FET), for example.

LTE module 22 includes integrated circuit components for transmitting and receiving signals in accordance with E-UTRA, which are power amplifier 23, low noise amplifier (LNA) 24, transmission reception switch 25, and bandpass filter 26. Power amplifier 23 is a circuit that amplifies power of a transmission signal input through input switch 21, and changes the gain under the control of RF signal processing circuit 11. Low noise amplifier 24 is a circuit that amplifies, with low noise, a reception signal input through transmission reception switch 25. Power amplifier 23 and low noise amplifier 24 each include a bipolar transistor and/or an FET, for example. Note that LTE module 22 also includes a switch circuit (not illustrated) that allows and stops supply of power from a power supply circuit (not illustrated) to power amplifier 23 under the control of RF signal processing circuit 11. LTE module 22 may be replaced with a discrete circuit that includes separate circuit components.

Transmission reception switch 25 is a single pole double throw (SPDT) switch that includes one common terminal connected to bandpass filter 26, and two selection terminals connected to the output terminal of power amplifier 23 and the input terminal of low noise amplifier 24. Transmission reception switch 25 performs time division duplex (TDD) for transmitting and receiving signals in a time sharing manner by switching between input of a transmission signal output from power amplifier 23 to bandpass filter 26 and input of a reception signal output from bandpass filter 26 to low noise amplifier 24, under the control of RF signal processing circuit 11. Transmission reception switch 25 includes a plurality of FETs, for example. Note that transmission reception switch 25 may be replaced with a duplexer that includes a transmission filter and a receiving filter. In this case, frequency division duplex (FDD) for simultaneously transmitting and receiving signals using different frequency bands can be performed.

Bandpass filter 26 allows a signal in a frequency band used for E-UTRA to pass through. In the present embodiment, bandpass filter 26 is a group of bandpass filters having frequency bands used for E-UTRA (for example, frequency bands shown in Table 1 below), and allows a signal in a frequency band of one of the bandpass filters selected by RF signal processing circuit 11 to pass through. Bandpass filter 26 includes, for example, a plurality of surface acoustic wave filters, and a switch circuit that selects one of the surface acoustic wave filters and allows a signal to pass through.

TABLE 1

| Frequency band | Uplink (MHz) | Downlink (MHz) |
| --- | --- | --- |
| B2 | 1850-1910 | 1930-1990 |
| B3 | 1710-1785 | 1805-1880 |
| B13 | 777-787 | 746-756 |
| B20 | 832-862 | 791-821 |
| B26 | 814-849 | 859-894 |
| B41 | 2496-2690 | 2496-2690 |
| B42 | 3400-3600 | 3400-3600 |
| B71 | 663-698 | 617-652 |

Second transfer circuit 30 is an example of a transfer circuit that includes a second transmitter circuit that can transmit, simultaneously with the first transmitter circuit, a signal with lower transmission power than that of the first transmitter circuit. In the present embodiment, second transfer circuit 30 is a radio frequency circuit that transmits and receives signals in accordance with NR, and includes input switch 31, NR module 32, and one switch (second antenna switch 12b) in antenna switch 12. Note that the second transmitter circuit corresponds to a circuit for transmission that includes, among the elements of second transfer circuit 30, input switch 31 and one switch (second antenna switch 12b) in antenna switch 12, and power amplifier (PA) 33, transmission reception switch 35, and bandpass filter 36 that are included in NR module 32.

Input switch 31 is an example of a second switch connected to the input terminal of power amplifier 33 included in NR module 32, and allows and interrupts input of a transmission signal output by RF signal processing circuit 11 to power amplifier 33, under the control of RF signal processing circuit 11. Input switch 31 includes an FET, for example.

NR module 32 includes integrated circuit components for transmitting and receiving signals in accordance with NR, and includes power amplifier 33, low noise amplifier (LNA) 34, transmission reception switch 35, and bandpass filter 36. Power amplifier 33 is a circuit that amplifies power of a transmission signal input through input switch 31, and changes the gain under the control of RF signal processing circuit 11. Low noise amplifier 34 is a circuit that amplifies, with low noise, a reception signal input through transmission reception switch 35. Power amplifier 33 and low noise amplifier 34 each include a bipolar transistor and/or an FET, for example. Note that NR module 32 also includes a switch circuit (not illustrated) that allows and stops supply of power from a power supply circuit (not illustrated) to power amplifier 33, under the control of RF signal processing circuit 11. NR module 32 may be replaced with a discrete circuit that includes separate circuit components.

Transmission reception switch 35 is an example of a second switch connected to the output terminal of power amplifier 33, and is an SPDT switch that includes one common terminal connected to bandpass filter 36, and two selection terminals connected to the output terminal of power amplifier 33 and the input terminal of low noise amplifier 34. Transmission reception switch 35 performs TDD by switching between, under the control of RF signal processing circuit 11, input of a transmission signal output from power amplifier 33 to bandpass filter 36 and input of a reception signal output from bandpass filter 36 to low noise amplifier 34. Transmission reception switch 35 includes a plurality of FETs, for example. Note that transmission reception switch 35 may be replaced with a duplexer that includes a transmission filter and a receiving filter. In this case, FDD is performed.

Bandpass filter 36 allows a signal in a frequency band used for NR to pass through. In the present embodiment, bandpass filter 36 is a group of bandpass filters having frequency bands defined for NR (for example, frequency bands shown in Table 2 below), and allows a signal in a frequency band of one of the bandpass filters selected by RF signal processing circuit 11 to pass through. Bandpass filter 36 includes, for example, a plurality of surface acoustic wave filters, and a switch circuit that selects one of the surface acoustic wave filters and allows a signal to pass through.

TABLE 2

| Frequency band | Uplink (MHz) | Downlink (MHz) |
| --- | --- | --- |
| n3 | 1710-1785 | 1805-1880 |
| n26 | 814-849 | 859-894 |
| n28 | 703-748 | 758-803 |
| n41 | 2496-2690 | 2496-2690 |
| n66 | 1710-1780 | 2110-2200 |
| n71 | 663-698 | 617-652 |
| n77 | 3300-4200 | 3300-4200 |
| n78 | 3300-3800 | 3300-3800 |

Examples of the combination of simultaneously used frequency bands of bandpass filter 26 of first transfer circuit 20 and bandpass filter 36 of second transfer circuit 30 include B2-n66, B3-n3, B3-n77, B3-n78, B13-n26, B20-n28, B26-n71, B41-n41, B42-n77, B42-n78, and B71-n71.

Antenna switch 12 includes single pole single throw (SPST) first antenna switch 12a that connects and disconnects LTE module 22 to/from first antenna 13a, and SPST second antenna switch 12b that connects and disconnects NR module 32 to/from second antenna 13b. First antenna switch 12a constitutes a portion of first transfer circuit 20. Second antenna switch 12b constitutes a portion of second transfer circuit 30, and is an example of a first switch that connects and disconnects the second transmitter circuit to/from the antenna. Antenna switch 12 controls turning on and off first antenna switch 12a and second antenna switch 12b, separately, under the control of RF signal processing circuit 11. Antenna switch 12 includes a plurality of FETs, for example.

First antenna 13a includes an antenna element suitable for transmitting and receiving signals in accordance with E-UTRA.

Second antenna 13b includes an antenna element suitable for transmitting and receiving signals in accordance with NR.

RF signal processing circuit (RFIC) 11 functions as a signal source that supplies radio frequency transmission signals obtained by modulating baseband signals to first transfer circuit 20 and second transfer circuit 30, functions as a receiving circuit that receives and demodulates radio frequency reception signals processed by first transfer circuit 20 and second transfer circuit 30, and functions as a control circuit that controls first transfer circuit 20 and second transfer circuit 30.

More specifically, when the terminal device is in an EN-DC operation mode, if at least one of the first transmitter circuit and the second transmitter circuit does not satisfy the requirements on spurious emissions due to intermodulation distortion, RF signal processing circuit 11 basically performs, as a control circuit, control to uniformly decrease transmission power of the first transmitter circuit and transmission power of the second transmitter circuit by a predetermined value by decreasing the gain of power amplifier 23 in the first transmitter circuit and the gain of power amplifier 33 in the second transmitter circuit. Note that RF signal processing circuit 11 controls a transmitter circuit whose transmission power resulting from being decreased by the predetermined value is lower than or equal to a threshold, to place the transmitter circuit in a transmission halt state. Here, a threshold is a defined value predetermined for each of the transmitter circuits as a lower limit of transmission power. Further, the transmission halt state is a state where a transmission signal is not supplied to an antenna, that is, radio waves to be transmitted are not radiated. In the transmission halt state, a receiving operation may be continuously performed or may be halted.

Specifically, control to place the first transmitter circuit in the transmission halt state includes at least one of: turning off first antenna switch 12a; turning off input switch 21; disconnecting, by transmission reception switch 25, the output terminal of power amplifier 23 from bandpass filter 26; stopping supply of power to power amplifier 23; or stopping, by RF signal processing circuit 11, supply of a transmission signal to the first transmitter circuit. Which control is to be selected is determined by, for example, a system processor (not illustrated) included in the terminal device providing designation for RF signal processing circuit 11 in accordance with a user instruction.

Further, control to place the second transmitter circuit in the transmission halt state includes at least one of: turning off second antenna switch 12b; turning off input switch 31; disconnecting, by transmission reception switch 35, the output terminal of power amplifier 33 from bandpass filter 36; stopping supply of power to power amplifier 33; or stopping, by RF signal processing circuit 11, supply of a transmission signal to the second transmitter circuit. Which control is to be selected is determined by, for example, a system processor (not illustrated) included in the terminal device providing designation for RF signal processing circuit 11 in accordance with a user instruction.

Next, operation of communication circuit 10 according to the present embodiment having a configuration as above is to be described.

Figure 2:
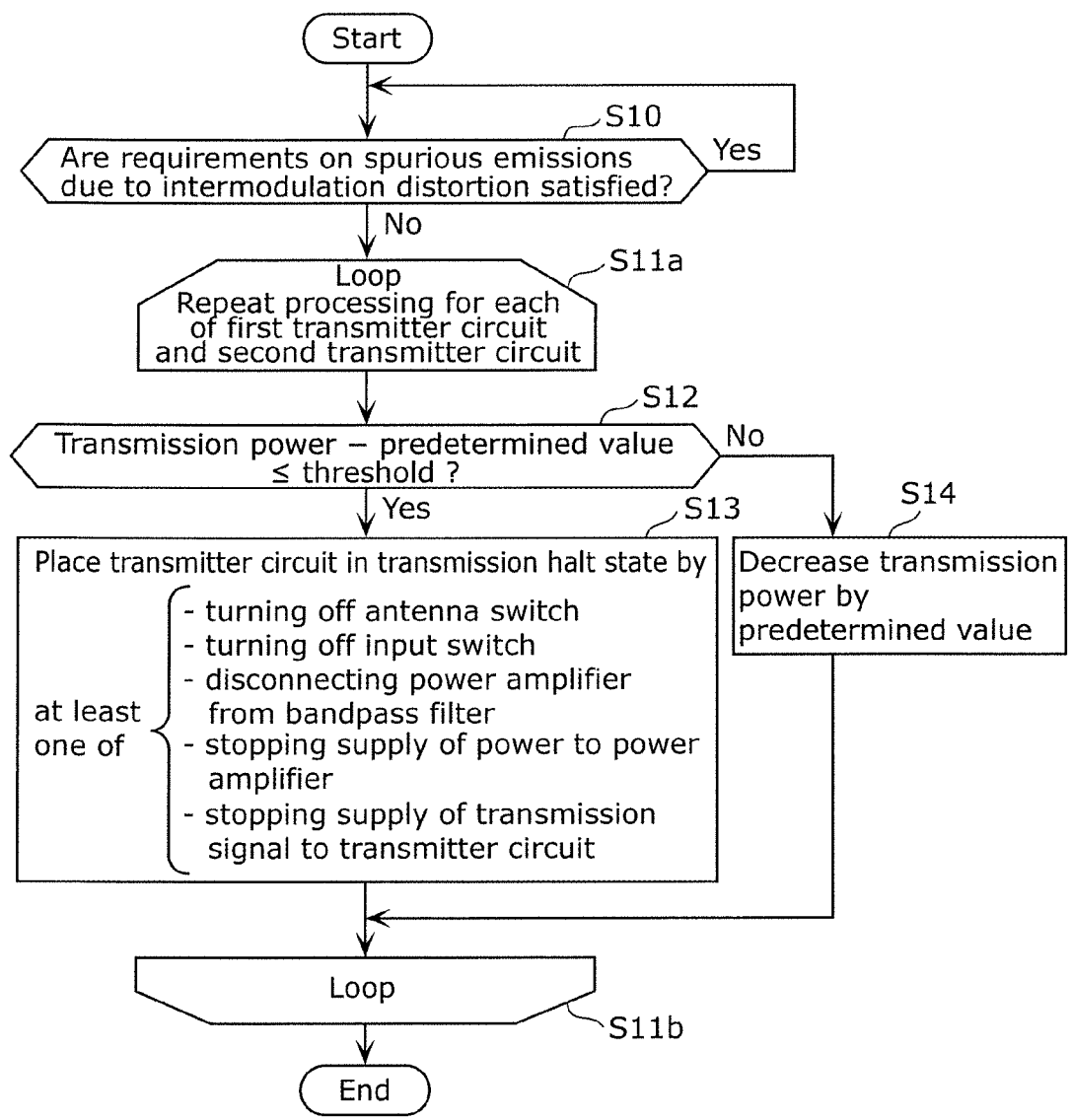
FIG. 2 is a flowchart illustrating operation of the communication circuit according to the embodiment.

FIG. 2 is a flowchart illustrating operation of communication circuit 10 according to the present embodiment. Here, the procedure of control by RF signal processing circuit 11 (that is, a control method for communication circuit 10) in EN-DC is illustrated.

It is assumed that the terminal device that includes communication circuit 10 is in an EN-DC operation mode, which allows first transfer circuit 20 (that is, the first transmitter circuit) and second transfer circuit 30 (that is, the second transmitter circuit) to simultaneously transmit signals.

RF signal processing circuit 11 determines whether the first transmitter circuit and the second transmitter circuit satisfy the requirements on spurious emissions due to intermodulation distortion (S10). Specifically, using couplers (not illustrated) disposed directly under first antenna 13a and second antenna 13b and/or based on the intensities of signals in a spurious band input through low noise amplifiers 24 and 34, RF signal processing circuit 11 detects the amount of spurious component caused by intermodulation distortion, and determines whether the detected amount is smaller than or equal to a value specified in the requirements.

As a result, if both the first transmitter circuit and the second transmitter circuit satisfy the requirements on spurious emissions due to intermodulation distortion (Yes in S10), RF signal processing circuit 11 repeats the determination in step S10.

On the other hand, at least one of the first transmitter circuit or the second transmitter circuit is determined to fail satisfying the requirements on spurious emissions due to intermodulation distortion (No in S10), RF signal processing circuit 11 repeats the following processing for each of the first transmitter circuit and the second transmitter circuit (S11a to S11b).

Specifically, RF signal processing circuit 11 determines whether transmission power as a result of current transmission power being decreased by a predetermined value is lower than or equal to the threshold of the transmitter circuit (S12).

If the result shows that the transmission power as a result of the current transmission power being decreased by the predetermined value is determined to be lower than or equal to the threshold (Yes in S12), RF signal processing circuit 11 performs control to place the transmitter circuit in the transmission halt state (S13). Specifically, if the first transmitter circuit is to be placed in the transmission halt state, RF signal processing circuit 11 performs at least one of: turning off first antenna switch 12a; turning off input switch 21; disconnecting, by transmission reception switch 25, the output terminal of power amplifier 23 from bandpass filter 26; stopping supply of power to power amplifier 23; or stopping, by RF signal processing circuit 11, supply of a transmission signal to the first transmitter circuit. When the second transmitter circuit is to be placed in the transmission halt state, RF signal processing circuit 11 performs at least one of: turning off second antenna switch 12b; turning off input switch 31; disconnecting, by transmission reception switch 35, the output terminal of power amplifier 33 from bandpass filter 36; stopping supply of power to power amplifier 33; or stopping, by RF signal processing circuit 11, supply of a transmission signal to the second transmitter circuit.

On the other hand, if RF signal processing circuit 11 determines that transmission power as a result of current transmission power being decreased by the predetermined value is not lower than or equal to the threshold (that is, higher than the threshold) (No in S12), RF signal processing circuit 11 performs control to decrease transmission power by the predetermined value (S14). Specifically, when transmission power of the first transmitter circuit is to be decreased by the predetermined value, RF signal processing circuit 11 decreases the gain of power amplifier 23 of the first transmitter circuit by the predetermined value. Further, when the transmission power of the second transmitter circuit is to be decreased by the predetermined value, RF signal processing circuit 11 decreases the gain of power amplifier 33 of the second transmitter circuit by the predetermined value.

When the terminal device is in the EN-DC operation mode, if at least one of the first transmitter circuit or the second transmitter circuit fails to satisfy the requirements on spurious emissions due to intermodulation distortion and thus RF signal processing circuit 11 performs control to uniformly decrease transmission power of the first transmitter circuit and transmission power of the second transmitter circuit by the predetermined value, a transmitter circuit whose transmission power resulting from being decreased by the predetermined value is lower than or equal to the threshold is placed in the transmission halt state through the above processing. Accordingly, a transmitter circuit whose transmission power is decreased by the predetermined value is prevented from transmitting a signal in a state where the transmission power is at or below the lower limit, and can perform transmission that satisfies the requirements on spurious emissions due to intermodulation distortion.

Note that in the present embodiment, determination in step S10 and processing of steps S12 to S14 are performed for both the first transmitter circuit and the second transmitter circuit, yet the present embodiment is not limited thereto, and the determination and the processing are performed for only one of the first transmitter circuit and the second transmitter circuit. For example, in the case where, for instance, it is known in advance that a transmitter circuit whose transmission power resulting from being decreased by the predetermined value may be lower than or equal to the threshold is limited only to the second transmitter circuit that transmits a signal with lower transmission power, the determination in step S10 and the processing of steps S12 to S14 may be performed for only the second transmitter circuit.

As described above, communication device 10 according to the present embodiment includes: first transfer circuit 20 that includes a first transmitter circuit; and second transfer circuit 30 that includes a second transmitter circuit configured to transmit a signal simultaneously with the first transmitter circuit. The second transmitter circuit is configured to be placed in a transmission halt state when transmission power of the second transmitter circuit resulting from being decreased by a predetermined value is lower than or equal to a threshold.

Accordingly, when at least one of the first transmitter circuit or the second transmitter circuit fails to satisfy the requirements on spurious emissions due to intermodulation distortion and thus control to uniformly decrease transmission power of the first transmitter circuit and transmission power of the second transmitter circuit by the predetermined value is performed, if transmission power of the second transmitter circuit resulting from being decreased by the predetermined value is lower than or equal to the threshold, the second transmitter circuit is placed in the transmission halt state. Thus, a transmitter circuit whose transmission power is decreased by the predetermined value is prevented from transmitting a signal in a state where the transmission power is at or below the lower limit and furthermore, transmission power of the first transmitter circuit and transmission power of the second transmitter circuit are uniformly decreased by the predetermined value, and thus the requirements on spurious emissions due to intermodulation distortion can be complied with.

Here, the second transmitter circuit includes: second antenna switch 12b configured to connect the second transmitter circuit to second antenna 13b, and disconnect the second transmitter circuit from second antenna 13b, and the second transmitter circuit is configured to be placed in the transmission halt state by second antenna switch 12b being turned off. Accordingly, the second transmitter circuit is disconnected from second antenna 13b, which ensures that the second transmitter circuit is placed in the transmission halt state.

The second transmitter circuit includes: power amplifier 33; input switch 31 connected to the input terminal of power amplifier 33; and transmission reception switch 35 connected to the output terminal of power amplifier 33, and input switch 31 is turned off or transmission reception switch 35 disconnects the output terminal of power amplifier 33 from a circuit disposed downstream thereof. Accordingly, power amplifier 33 is disconnected in the second transmitter circuit, which ensures that the second transmitter circuit is placed in the transmission halt state.

The second transmitter circuit includes power amplifier 33, and is configured to be placed in the transmission halt state by supply of power to power amplifier 33 being stopped. Accordingly, supply of power to power amplifier 33 is stopped, and thus the second transmitter circuit is caused to stop transmission operation so as to be placed in the transmission halt state, and furthermore power consumption of the second transmitter circuit is reduced in the transmission halt state.

Communication circuit 10 further includes: RF signal processing circuit 11 as a signal source configured to supply a transmission signal to the second transmitter circuit. The second transmitter circuit is configured to be placed in the transmission halt state by RF signal processing circuit 11 stopping supply of the transmission signal to the second transmitter circuit. Accordingly, no transmission signal is input to the second transmitter circuit, which ensures that the second transmitter circuit is placed in the transmission halt state.

Communication circuit 10 further includes: RF signal processing circuit 11 as a control circuit configured to perform control to place the second transmitter circuit in the transmission halt state when the transmission power resulting from being decreased is lower than or equal to the threshold. The control circuit is configured to: calculate decreased transmission power of the second transmitter circuit, the decreased transmission power being the transmission power resulting from being decreased by the predetermined value; determine whether the decreased transmission power calculated is lower than or equal to the threshold; and perform control to place the second transmitter circuit in the transmission halt state when the control circuit determines that the decreased transmission power is lower than or equal to the threshold. Accordingly, under the control of the control circuit, a transmitter circuit whose transmission power is decreased by the predetermined value is prevented from transmitting a signal in a state where the transmission power is at or below the lower limit.

The second transmitter circuit is configured to transmit a signal with transmission power lower than transmission power of the first transmitter circuit. Accordingly, for example, when the first transmitter circuit transmits a signal in accordance with E-UTRA in which transmission power is higher, and the second transmitter circuit transmits a signal in accordance with NR in which transmission power is lower, the requirements on spurious emissions due to intermodulation distortion are complied with in EN-DC.

One of the first transmitter circuit and the second transmitter circuit is configured to transmit a signal in accordance with a fourth generation mobile communication system, and another of the first transmitter circuit and the second transmitter circuit is configured to transmit a signal in accordance with a fifth generation mobile communication system. Specifically, one of the first transmitter circuit and the second transmitter circuit transmits a signal in accordance with E-UTRA, and the other of the first transmitter circuit and the second transmitter circuit transmits a signal in accordance with NR. Examples of the combination of the frequency bands in which the one and the other of the first transmitter circuit and the second transmitter circuit transmit signals include: E-UTRA band B2 and NR band n66; E-UTRA band B3 and NR band n77; E-UTRA band B3 and NR band n78; E-UTRA band B13 and NR band n26; E-UTRA band B20 and NR band n28; E-UTRA band B26 and NR band n71; E-UTRA band B42 and NR band n77; and E-UTRA band B42 and NR band n78.

Accordingly, for example, when the first transmitter circuit transmits a signal in accordance with E-UTRA, and the second transmitter circuit transmits a signal in accordance with NR, the requirements on spurious emissions due to intermodulation distortion are complied with in EN-DC.

A control method for communication circuit 10 according to the present embodiment is a control method for communication circuit 10 that includes a first transmitter circuit, and a second transmitter circuit configured to transmit a signal simultaneously with the first transmitter circuit, the control method including: calculating decreased transmission power of the second transmitter circuit, the decreased transmission power being transmission power of the second transmitter circuit resulting from being decreased by a predetermined value, and determining whether the decreased transmission power calculated is lower than or equal to a threshold (S12); and performing control to place the second transmitter circuit in a transmission halt state (S13) when the decreased transmission power is determined to be lower than or equal to the threshold (Yes in S12).

Accordingly, when at least one of the first transmitter circuit or the second transmitter circuit fails to satisfy the requirements on spurious emissions due to intermodulation distortion, and thus control to uniformly decrease transmission power of the first transmitter circuit and transmission power of the second transmitter circuit by the predetermined value is performed, if the transmission power of the second transmitter circuit resulting from being decreased by the predetermined value is lower than or equal to the threshold, the second transmitter circuit is placed in the transmission halt state. Accordingly, a transmitter circuit whose transmission power is decreased by the predetermined value is prevented from transmitting a signal in a state where the transmission power is at or below the lower limit and furthermore, transmission power of the first transmitter circuit and transmission power of the second transmitter circuit are uniformly decreased by the predetermined value, and thus the requirements on spurious emissions due to intermodulation distortion can be complied with.

Variation 1

Next, a communication circuit according to Variation 1 of the embodiment above is to be described.

The communication circuit according to this variation basically has the same configuration as that of communication circuit 10 according to the above embodiment, except for the function of RF signal processing circuit 11 serving as a control circuit.

In this variation, when the terminal device is in the EN-DC operation mode if at least one of the first transmitter circuit or the second transmitter circuit does not satisfy the requirements on spurious emissions due to intermodulation distortion, RF signal processing circuit 11 basically performs, as a control circuit, control to uniformly decrease transmission power of the first transmitter circuit and transmission power of the second transmitter circuit by the predetermined value, by decreasing the gain of power amplifier 23 of the first transmitter circuit and the gain of power amplifier 33 of the second transmitter circuit. Note that RF signal processing circuit 11 performs control to allow a transmitter circuit whose transmission power resulting from being decreased by the predetermined value is lower than or equal to the threshold to transmit a signal with transmission power higher than the threshold. Specifically, for example, if transmission power as a result of transmission power of the second transmitter circuit lower than that of the first transmitter circuit being decreased by the predetermined value is lower than or equal to the threshold, RF signal processing circuit 11 performs control to allow the first transmitter circuit to transmit a signal with transmission power resulting from being decreased by a value greater than the predetermined value, and allow the second transmitter circuit to transmit a signal with transmission power higher than the threshold.

Figure 3:
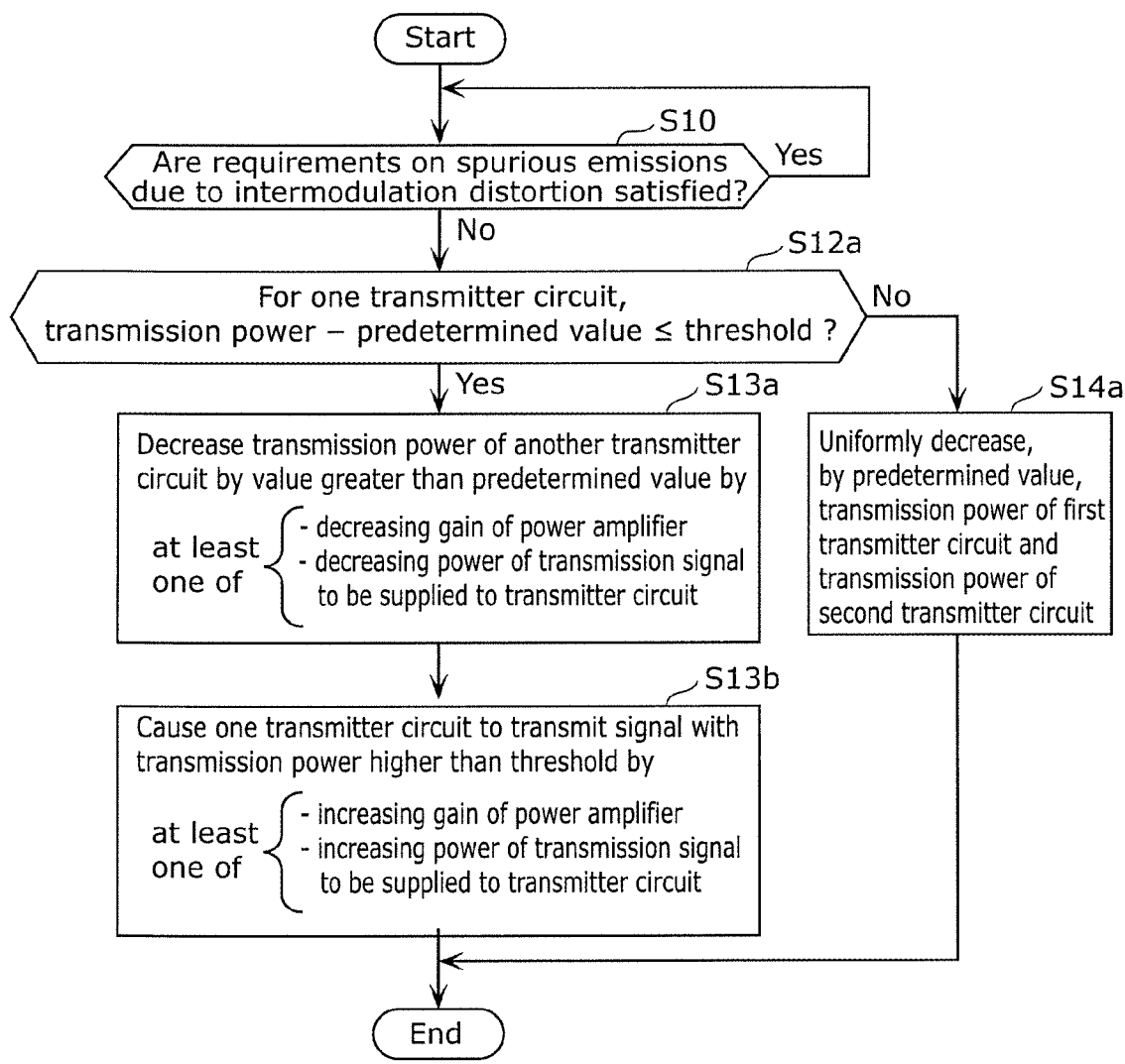
FIG. 3 is a flowchart illustrating operation of a communication circuit according to Variation 1 of the embodiment.

FIG. 3 is a flowchart illustrating operation of the communication circuit according to this variation. Here, the procedure of control by RF signal processing circuit 11 (that is, a control method for the communication circuit) in EN-DC is illustrated.

It is assumed that the terminal device that includes the communication circuit is in the EN-DC operation mode, which allows first transfer circuit 20 (that is, the first transmitter circuit) and second transfer circuit 30 (that is, the second transmitter circuit) to simultaneously transmit signals.

RF signal processing circuit 11 determines whether the first transmitter circuit and the second transmitter circuit satisfy the requirements on spurious emissions due to intermodulation distortion (S10). The processing in S10 and processing performed when the determination result is "Yes" in step S10 are the same as those in the above embodiment.

In step S10, when at least one transmitter circuit out of the first transmitter circuit and the second transmitter circuit is determined to fail to satisfy the requirements on spurious emissions due to intermodulation distortion (No in S10), RF signal processing circuit 11 subsequently determines, for one of the first transmitter circuit and the second transmitter circuit (that is, the at least one transmitter circuit), whether transmission power resulting from current transmission power being decreased by the predetermined value is lower than or equal to the threshold of the transmitter circuit (S12a).

As a result, if transmission power resulting from current transmission power being decreased by the predetermined value is determined to be lower than or equal to the threshold (Yes in S12a), RF signal processing circuit 11 first performs control to decrease transmission power of the other transmitter circuit by a value greater than the predetermined value (S13a). Specifically, RF signal processing circuit 11 performs at least one of decreasing the gain of the power amplifier of the other transmitter circuit, or decreasing power of a transmission signal that RF signal processing circuit 11 supplies to the other transmitter circuit.

Next, RF signal processing circuit 11 performs control to change transmission power of the one transmitter circuit to cause the one transmitter circuit to transmit a signal with transmission power higher than the threshold used in step S12a above (S13b). Specifically, RF signal processing circuit 11 performs at least one of increasing the gain of the power amplifier of the one transmitter circuit or increasing power of a transmission signal that RF signal processing circuit 11 supplies to the one transmitter circuit, relative to the gain and the power when the one transmitter circuit transmits a signal with transmission power at the threshold.

Note that control to decrease transmission power of the other transmitter circuit by a value greater than the predetermined value (S13a) is performed prior to step S13b, and thus in step S13b, even if transmission power of the one transmitter circuit is changed to increase, at least one of the first transmitter circuit or the second transmitter circuit is prevented from failing to satisfy the requirements on spurious emissions due to intermodulation distortion.

On the other hand, if it is determined for both the first transmitter circuit and the second transmitter circuit in step S12a that transmission power resulting from current transmission power being decreased by the predetermined value is not lower than or equal to the threshold (No in S12a), RF signal processing circuit 11 performs, for both the first transmitter circuit and the second transmitter circuit, control to decrease transmission power by the predetermined value, in accordance with the requirements (S14a). Specifically, RF signal processing circuit 11 decreases the gain of power amplifier 23 of the first transmitter circuit by the predetermined value, and decreases the gain of power amplifier 33 of the second transmitter circuit by the predetermined value.

Through the above processing, when a terminal device is in the EN-DC operation mode, if control to uniformly decrease transmission power of the first transmitter circuit and transmission power of the second transmitter circuit by the predetermined value is performed since at least one of the first transmitter circuit or the second transmitter circuit fails to satisfy the requirements on spurious emissions due to intermodulation distortion, a transmitter circuit whose transmission power resulting from being decreased by the predetermined value is lower than or equal to the threshold is controlled to allow the transmitter circuit to transmit a signal with transmission power higher than the threshold. Accordingly, a transmitter circuit whose transmission power is decreased by the predetermined value is prevented from transmitting a signal in a state where the transmission power is at or below the lower limit, and can perform transmission that satisfies the requirements on spurious emissions due to intermodulation distortion.

Note that in this variation, when it is determined for both the first transmitter circuit and the second transmitter circuit in step S12a that transmission power resulting from current transmission power being decreased by the predetermined value is lower than or equal to a threshold, and when decreasing transmission power of the other transmitter circuit by a value greater than the predetermined value in step S13a makes transmission power of the other transmitter circuit lower than or equal to the threshold, the other transmitter circuit may be placed in the transmission halt state as in the above embodiment.

As described above, the communication circuit according to this variation includes: first transfer circuit 20 that includes a first transmitter circuit; and second transfer circuit 30 that includes a second transmitter circuit configured to transmit a signal simultaneously with the first transmitter circuit. When transmission power of the second transmitter circuit resulting from being decreased by a predetermined value is lower than or equal to a threshold, the first transmitter circuit is configured to transmit a signal with transmission power resulting from being decreased by a value greater than the predetermined value, and the second transmitter circuit is configured to transmit a signal with transmission power higher than the threshold.

Accordingly, if at least one of the first transmitter circuit or the second transmitter circuit fails to satisfy the requirements on spurious emissions due to intermodulation distortion, and thus control to uniformly decrease transmission power of the first transmitter circuit and transmission power of the second transmitter circuit by the predetermined value is performed, when the transmission power of the second transmitter circuit resulting from being decreased by the predetermined value is lower than or equal to the threshold, the first transmitter circuit transmits a signal with transmission power resulting from being decreased by a value greater than the predetermined value, and the second transmitter circuit transmits a signal with transmission power higher than the threshold. Accordingly, a transmitter circuit whose transmission power is decreased by the predetermined value is prevented from transmitting a signal in a state where the transmission power is at or below the lower limit and furthermore, transmission power of the first transmitter circuit and transmission power of the second transmitter circuit are uniformly decreased by the predetermined value, and thus the requirements on spurious emissions due to intermodulation distortion can be complied with.

Here, the second transmitter circuit includes power amplifier 33, and is configured to increase a gain of power amplifier 33 when the transmission power of the second transmitter circuit resulting from being decreased by the predetermined value is lower than or equal to the threshold. Accordingly, the gain of power amplifier 33 of the second transmitter circuit increases, which ensures that the second transmitter circuit transmits a signal with transmission power higher than the threshold.

The communication circuit further includes: RF signal processing circuit 11 as a signal source configured to supply a transmission signal to the first transmitter circuit and a transmission signal to the second transmitter circuit. When the transmission power of the second transmitter circuit resulting from being decreased by the predetermined value is lower than or equal to the threshold, the signal source is configured to increase power of the transmission signal to be supplied to the second transmitter circuit. Accordingly, the power of a transmission signal supplied to the second transmitter circuit is increased, which ensures that the second transmitter circuit transmits a signal with transmission power higher than the threshold.

The communication circuit further includes: RF signal processing circuit 11 as a control circuit configured to perform control, when the transmission power of the second transmitter circuit resulting from being decreased by the predetermined value is lower than or equal to the threshold, to cause the first transmitter circuit to transmit a signal with the transmission power resulting from being decreased by the value greater than the predetermined value, and to cause the second transmitter circuit to transmit a signal with the transmission power higher than the threshold. Accordingly, under the control of the control circuit, a transmitter circuit whose transmission power is decreased by the predetermined value is prevented from transmitting a signal in a state where the transmission power is at or below the lower limit.

A control method for the communication circuit according to this variation is a control method for a communication circuit that includes a first transmitter circuit, and a second transmitter circuit configured to transmit a signal simultaneously with the first transmitter circuit, the control method including: calculating decreased transmission power of the second transmitter circuit, the decreased transmission power being transmission power of the second transmitter circuit resulting from being decreased by a predetermined value, and determining whether the decreased transmission power calculated is lower than or equal to a threshold (S12a); and performing control when the decreased transmission power is determined to be lower than or equal to the threshold (Yes in S12a), to cause the first transmitter circuit to transmit a signal with transmission power resulting from being decreased by a value greater than the predetermined value (S13a), and to cause the second transmitter circuit to transmit a signal with transmission power higher than the threshold (S13b).

Accordingly, if at least one of the first transmitter circuit or the second transmitter circuit fails to satisfy the requirements on spurious emissions due to intermodulation distortion and thus control to uniformly decrease transmission power of the first transmitter circuit and transmission power of the second transmitter circuit by the predetermined value is performed, when the transmission power of the second transmitter circuit resulting from being decreased by the predetermined value is lower than or equal to the threshold, the first transmitter circuit transmits a signal with transmission power resulting from being decreased by a value greater than the predetermined value, and the second transmitter circuit transmits a signal with transmission power higher than the threshold. Accordingly, a transmitter circuit whose transmission power is decreased by the predetermined value is prevented from transmitting a signal in a state where the transmission power is at or below the lower limit and furthermore, transmission power of the first transmitter circuit and transmission power of the second transmitter circuit are uniformly decreased by the predetermined value, and thus the requirements on spurious emissions due to intermodulation distortion can be complied with.

Variation 2

Next, a communication circuit according to Variation 2 of the above embodiment is to be described.

Figure 4:
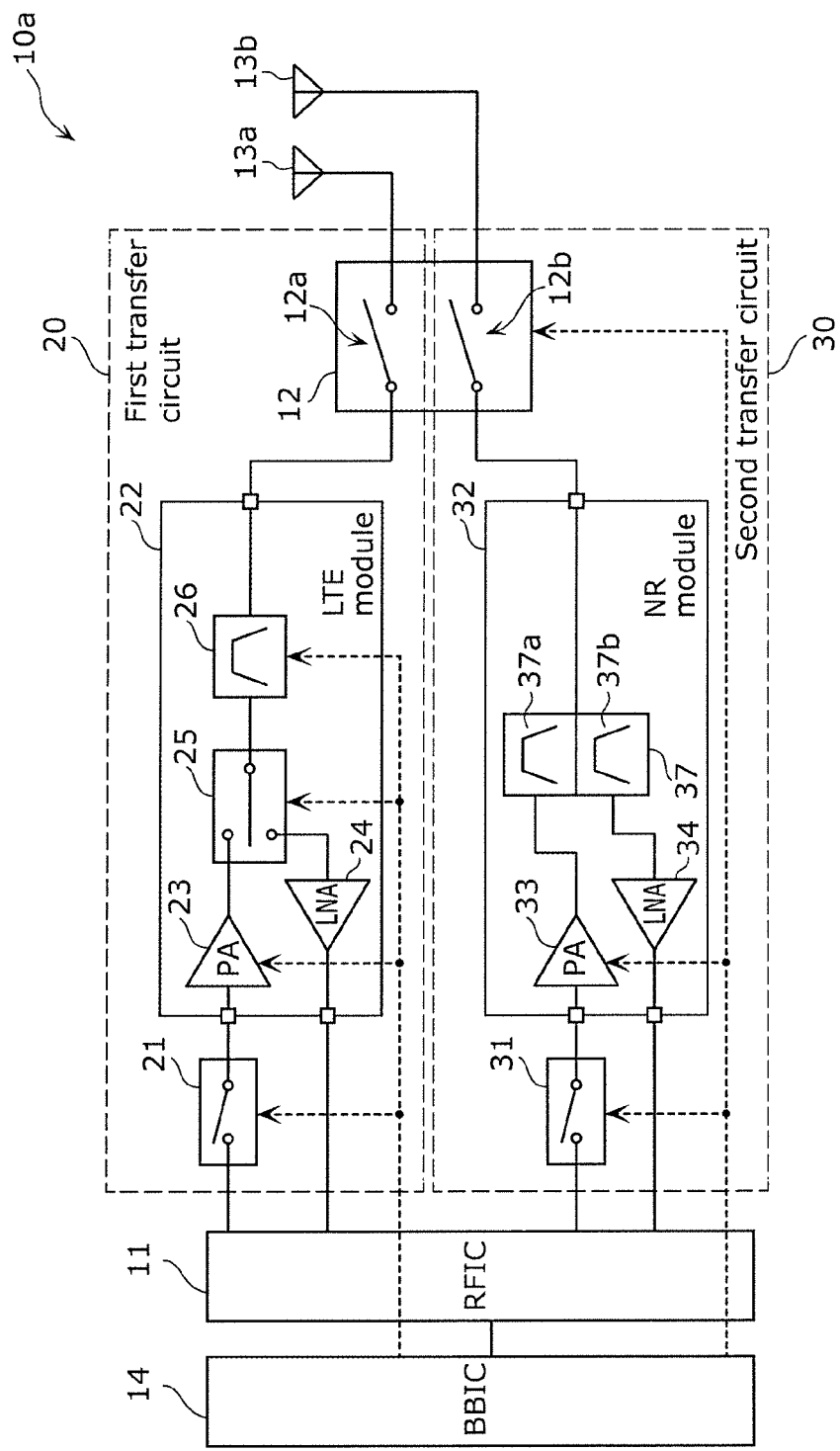
FIG. 4 is a block diagram of a communication circuit according to Variation 2 of the embodiment.

FIG. 4 is a block diagram of communication circuit 10a according to Variation 2 of the embodiment. Communication circuit 10a according to this variation has a configuration in which transmission reception switch 35 and bandpass filter 36 in communication circuit 10 according to the above embodiment are replaced with duplexer 37, and baseband signal processing circuit (BBIC) 14 is additionally included.

Baseband signal processing circuit 14 is a circuit that processes baseband signals such as an image signal and an audio signal, supplies a baseband signal as a transmission signal to RF signal processing circuit 11, receives a reception signal from RF signal processing circuit 11 and processes the signal, and functions as a control circuit that controls first transfer circuit 20 and second transfer circuit 30. Specifically, in the above embodiment, RF signal processing circuit 11 controls to place first transfer circuit 20 and second transfer circuit 30 in the transmission halt state, yet in this variation, baseband signal processing circuit 14 controls to place first transfer circuit 20 and second transfer circuit 30 in the transmission halt state, instead of RF signal processing circuit 11.

Duplexer 37 is a component that replaces transmission reception switch 35 and bandpass filter 36 in the above embodiment, and includes transmission filter 37a and receiving filter 37b. Duplexer 37 includes a plurality of surface acoustic wave filters, for example. Transmission filter 37a is a bandpass filter that allows a signal in the uplink frequency band used for NR to pass through, and includes an input terminal connected to the output terminal of power amplifier 33 and an output terminal connected to second antenna switch 12b via the common terminal of duplexer 37. Receiving filter 37b is a bandpass filter that allows a signal in the downlink frequency band used for NR to pass through, and includes an input terminal connected to second antenna switch 12b via the common terminal of duplexer 37, and an output terminal connected to the input terminal of low noise amplifier 34. Such duplexer 37 allows second transfer circuit 30 to perform FDD in which signals are simultaneously transmitted and received in different frequency bands, unlike the above embodiment in which TDD is performed.

As described above, in the communication circuit according to this variation, instead of RF signal processing circuit 11 in the above embodiment, baseband signal processing circuit 14 controls to place first transfer circuit 20 and second transfer circuit 30 in the transmission halt state. Accordingly, processing similar to that in the above embodiment is performed, and similar advantageous effects as those in the above embodiment are exhibited. Furthermore, RF signal processing circuit 11 does not need to function as a control circuit, and thus is more simplified than RF signal processing circuit 11 in the above embodiment.

In this variation, duplexer 37 is disposed instead of transmission reception switch 35 and band pass filter 36 in the above embodiment, and thus FDD is performed and furthermore, complicated control for transmission reception switch 35 performed in the above embodiment is unnecessary.

Note that in this variation, baseband signal processing circuit 14 functions as a control circuit of RF signal processing circuit 11 in the above embodiment, yet instead of or in addition to this, baseband signal processing circuit 14 may function as a control circuit of RF signal processing circuit 11 in Variation 1 above. Specifically, if the terminal device is in the EN-DC operation mode, when baseband signal processing circuit 14 performs control to uniformly decrease transmission power of the first transmitter circuit and transmission power of the second transmitter circuit by the predetermined value, due to at least one of the first transmitter circuit or the second transmitter circuit failing to satisfy the requirements on spurious emissions due to intermodulation distortion, baseband signal processing circuit 14 may control a transmitter circuit whose transmission power resulting from being decreased by the predetermined value is lower than or equal to the threshold to allow the transmitter circuit to transmit a signal with transmission power higher than the threshold.

In this variation, duplexer 37 is disposed instead of transmission reception switch 35 and bandpass filter 36 in second transfer circuit 30, yet instead of or in addition to this, a duplexer may be disposed instead of transmission reception switch 25 and bandpass filter 26 in first transfer circuit 20. Accordingly, FDD is performed, and complicated control for transmission reception switch 25 performed in the above embodiment is unnecessary for first transfer circuit 20 that transmits a signal in accordance with E-UTRA.

The above has described the communication circuit and the control method for the communication circuit according to the present disclosure based on the embodiment, yet the present disclosure is not limited to this embodiment. The present disclosure also encompasses other embodiments obtained by applying various changes that may be conceived by a person skilled in the art to the embodiment and by combining some of the elements in the embodiment without departing from the scope of the present disclosure.

For example, in the above embodiment, communication circuit 10 not only transmits a signal, but also receives a signal, yet communication circuit 10 may only transmits a signal. Furthermore, first transfer circuit 20 and second transfer circuit 30 transmit and receive signals in accordance with E-UTRA and NR, but may transmit and receive signals in accordance with other mobile communication systems. The present disclosure is applicable to DC for simultaneous transmission using any two of the mobile communication systems.

Further, the control method for the communication circuit according to the present disclosure may be achieved as a program for causing a processor to perform the steps included in the control method, and a non-transitory recording medium such as a CD-ROM that stores the program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in, for example, communication apparatuses such as a mobile phone, as a communication circuit that includes two transmitter circuits that can simultaneously transmit signals, or in particular, as a communication circuit that can perform communication in compliance with the requirements in EN-DC.

The invention claimed is:

1. A communication circuit, comprising:
a first transmitter circuit; and
a second transmitter circuit configured to transmit a signal simultaneously with the first transmitter circuit,
wherein when transmission power of the second transmitter circuit, decreased by a predetermined value, is less than or equal to a threshold:
the first transmitter circuit is configured to transmit a first signal with a transmission power decreased by an amount greater than the predetermined value, and
the second transmitter circuit is configured to transmit a second signal with a transmission power greater than the threshold.

2. The communication circuit according to claim 1, wherein the second transmitter circuit comprises a power amplifier, and is configured to increase a gain of the power amplifier when the decreased transmission power of the second transmitter circuit is less than or equal to the threshold.

3. The communication circuit according to claim 1, further comprising:
a signal source configured to supply a transmission signal to the first transmitter circuit and a transmission signal to the second transmitter circuit,
wherein when the decreased transmission power of the second transmitter circuit is less than or equal to the threshold, the signal source is configured to increase a power of the transmission signal supplied to the second transmitter circuit.

4. The communication circuit according to claim 1, further comprising:
a control circuit configured to cause the first transmitter circuit to transmit a first signal with a transmission power decreased by an amount greater than the predetermined value, and to cause the second transmitter circuit to transmit a second signal with a transmission power greater than the threshold, when the decreased transmission power of the second transmitter circuit is less than or equal to the threshold.

5. The communication circuit according to claim 1, wherein the control circuit is configured to:
calculate the decreased transmission power of the second transmitter circuit;
determine whether the calculated decreased transmission power is less than or equal to the threshold; and
cause the first transmitter circuit to transmit the first signal and cause the second transmitter circuit to transmit the second signal, when the control circuit determines that the decreased transmission power is less than or equal to the threshold.

6. The communication circuit according to claim 1, wherein the second transmitter circuit is configured to transmit a signal with a transmission power less than a transmission power of the first transmitter circuit.

7. The communication circuit according to claim 1, wherein:
the first transmitter circuit or the second transmitter circuit is configured to transmit a first signal in accordance with a fourth generation mobile communication system, and
the other of the first transmitter circuit or the second transmitter circuit is configured to transmit a second signal in accordance with a fifth generation mobile communication system.

8. The communication circuit according to claim 7, wherein:
the first transmitter circuit or the second transmitter circuit is configured to transmit the first signal in accordance with Evolved Universal Terrestrial Radio Access (E-UTRA), and
the other of the first transmitter circuit or the second transmitter circuit is configured to transmit the second signal in accordance with New Radio (NR).

* * * * *